US008820643B1

(12) United States Patent
Lei et al.

(10) Patent No.: US 8,820,643 B1
(45) Date of Patent: Sep. 2, 2014

(54) SELECTING ILLUMINATION CHARACTERISTICS THAT WILL BE MOST SUITABLE FOR READING A BARCODE

(71) Applicant: The Code Corporation, Bluffdale, UT (US)

(72) Inventors: Ming Lei, Princeton Junction, NJ (US); Ryan Hoobler, Salt Lake City, UT (US)

(73) Assignee: The Code Corporation, Draper, UT (US)

( * ) Notice: Subject to any disclaimer, the term of this patent is extended or adjusted under 35 U.S.C. 154(b) by 0 days.

(21) Appl. No.: 13/946,862

(22) Filed: Jul. 19, 2013

(51) Int. Cl.
*G06K 7/10* (2006.01)
*G06K 7/14* (2006.01)

(52) U.S. Cl.
CPC .................................... *G06K 7/1465* (2013.01)
USPC .................................................... 235/462.06

(58) Field of Classification Search
USPC ................... 235/454, 462.2, 462.22, 462.25, 235/462.41, 462.42
See application file for complete search history.

(56) References Cited

U.S. PATENT DOCUMENTS

| 7,296,749 B2 * | 11/2007 | Massieu | 235/462.23 |
| 7,748,629 B2 * | 7/2010 | Brock | 235/462.11 |
| 7,815,120 B2 * | 10/2010 | Carlson | 235/462.41 |
| 8,002,187 B2 * | 8/2011 | Biss et al. | 235/462.25 |

* cited by examiner

*Primary Examiner* — Seung Lee
(74) *Attorney, Agent, or Firm* — Austin Rapp & Hardman

(57) ABSTRACT

A barcode reader may be configured to capture at least one test image of at least a portion of a barcode. The at least one test image may include a plurality of window images. Each window image may be smaller than a full photo sensor array image. Illumination for each window image may be provided by a distinct one of the plurality of illumination systems. The barcode reader may also be configured to determine a selected illumination system. The selected illumination system may be the illumination system that yielded a window image having highest quality among the plurality of window images. The barcode reader may also be configured to cause the photo sensor array to capture a subsequent image using the selected illumination system.

32 Claims, 11 Drawing Sheets

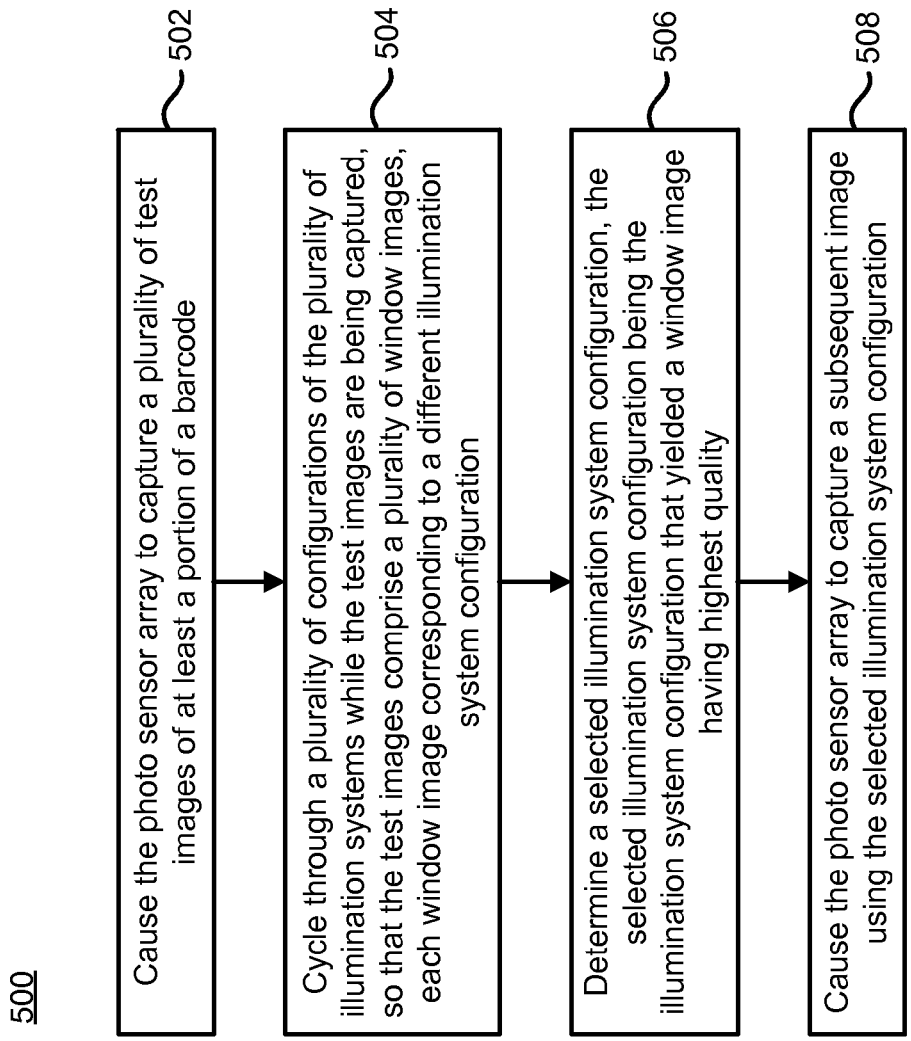

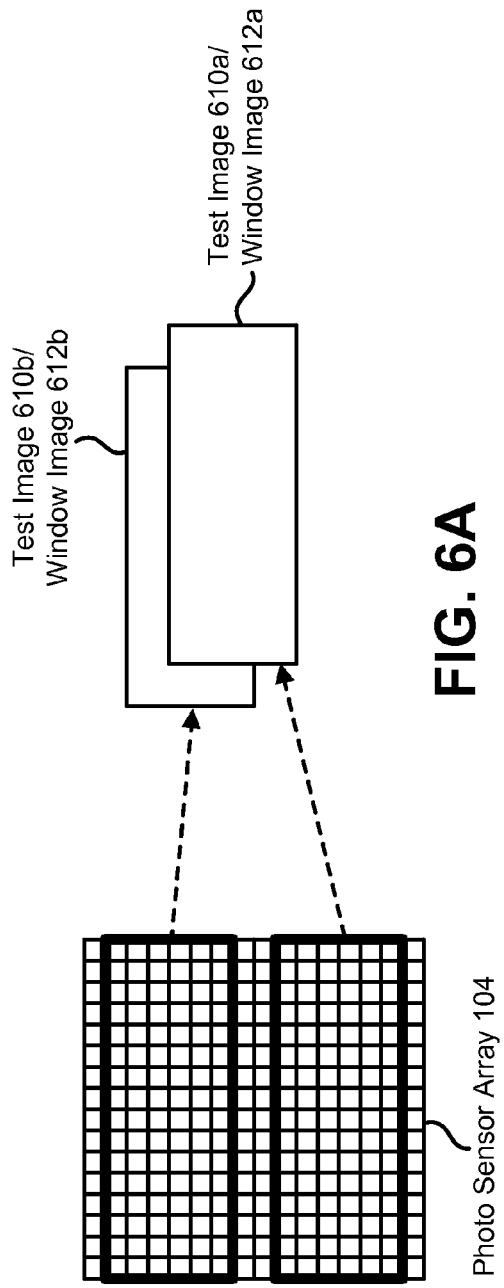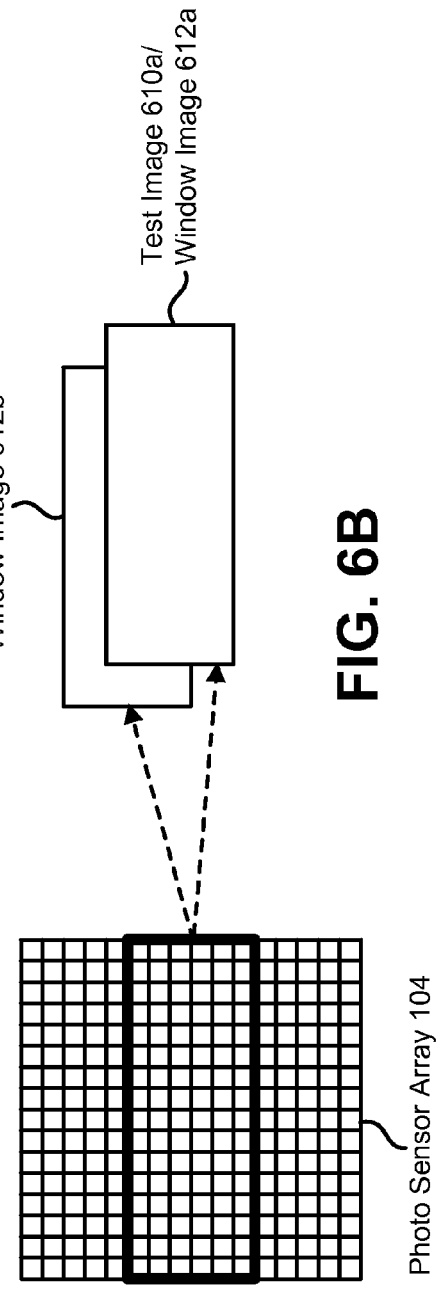

US 8,820,643 B1

SELECTING ILLUMINATION CHARACTERISTICS THAT WILL BE MOST SUITABLE FOR READING A BARCODE

TECHNICAL FIELD

The present disclosure relates generally to barcode readers that are capable of providing illumination having different illumination characteristics. More specifically, the present disclosure relates to techniques for selecting illumination characteristics that will be most suitable for reading a barcode in a particular situation.

BACKGROUND

A barcode is an optical machine-readable representation of information. Devices for identifying or extracting information from barcodes are generally referred to as barcode readers (or barcode scanners). An image-based barcode reader includes a camera for capturing an image of a barcode to be read. The camera includes a lens that focuses light reflected from a target area onto a photo sensor array. Once an image of a barcode has been captured by the camera, a decoder processes the image and extracts the information contained in the barcode.

Some barcode readers have multiple illumination systems for illuminating the target area. Each illumination system may have different illumination characteristics. For example, a barcode reader may be configured with two different illumination systems: a bright field illumination system and a dark field illumination system. The bright field illumination system may provide illumination having characteristics designed to illuminate a target area that is located relatively far away from the reader. Conversely, the dark field illumination system may provide illumination having characteristics designed to illuminate a target area that is located relatively close to the reader.

One problem that readers with multiple illumination systems have is that it is unknown which illumination system will provide the best illumination for reading a barcode in a particular situation. For example, a reader that has both bright field and dark field illumination may capture an image of a barcode using one of the two illumination systems and attempt to decode the barcode. If the barcode is not successfully decoded, a second image may be captured with the other illumination system, and another attempt may be made to decode the barcode.

SUMMARY

The present disclosure relates generally to techniques for selecting the type of illumination that will be most suitable for reading a barcode in a particular situation. In one aspect, a barcode reader may be configured to capture at least one test image of at least a portion of a barcode. The at least one test image may include a plurality of window images. Each window image may be smaller than a full photo sensor array image. Illumination for each window image may be provided by a distinct configuration of the plurality of illumination systems. The barcode reader may also be configured to determine a selected illumination system configuration. The selected illumination system configuration may be a configuration of the plurality of illumination systems that yielded a window image having highest quality among the plurality of window images. The barcode reader may also be configured to cause the photo sensor array to capture a subsequent image using the selected illumination system configuration.

In another aspect, a barcode reader may be configured to cause the photo sensor array to capture, using one or more test images, a plurality of window images of at least a portion of a barcode. The plurality of window images may include a first window image and a second window image. Each window image may be smaller than a full photo sensor array image. Illumination having a first set of illumination characteristics may be used for capturing the first window image, and illumination having a second set of illumination characteristics different than the first set of illumination characteristics may be used for capturing the second window image. The barcode reader may also be configured to determine a selected set of illumination characteristics. The selected set of illumination characteristics may be a set of illumination characteristics that yielded a window image having highest quality among the plurality of window images. The barcode reader may also be configured to cause the photo sensor array to capture a subsequent image using the selected set of illumination characteristics.

BRIEF DESCRIPTION OF THE DRAWINGS

FIG. 5 illustrates another example of a method that may be performed by the illumination selection circuitry in accordance with the present disclosure.

FIGS. 6A and 6B illustrate a plurality of test images comprising a plurality of window images.

DETAILED DESCRIPTION

Photo sensor arrays can be operated in two modes: a rolling shutter mode of operation and a global shutter mode of operation. In the global shutter mode of operation, all photo sensors within the array (i.e., all rows of the array) may be exposed at the same time for the duration of an exposure period. During the exposure period charge may accumulate on each photo sensor based on the incident illumination. At the end of the exposure period the charge may be read out row by row.

In the rolling shutter mode of operation, two different signals may be utilized: a reset signal and a read signal. The reset signal may affect all of the photo sensors in a row and may put the photo sensors in a state to convert light intensity into an electrical signal. The read signal may similarly be applied to all of the photo sensors in a row, and may cause the electrical signals from each photo sensor in the row to be read electronically.

To capture an image, the reset signal may be applied sequentially to each row in the photo sensor array, starting at the top of the photo sensor array and proceeding row-by-row to the bottom of the photo sensor array. At some fixed time interval after this reset process has started, the readout process may begin, i.e., the read signal may be applied sequentially to each row in the photo sensor array. The "exposure" of a row of photo sensors refers to the period of time between the row of photo sensors being reset and the row of photo sensors being read.

The exposure time may be expressed as an integer value. The actual exposure time may be the integer value multiplied by the duration of time required to read out a single row. As such, the size of the rolling "exposure zone" may be the quantity of lines represented by the integer value. For example, if the exposure value is 10, when exposure of row 1 is complete and read out of row 1 starts, row 11 would start exposure and be exposed for the duration of read out of rows 1 to 10.

In both the global shutter mode of operation and the rolling shutter mode of operation, windowing may be utilized. When windowing is utilized, only a portion of the photo sensor array (typically a horizontal window) is used for exposure and read out. For example, for the global shutter mode a window of 128 rows between rows 128 and 256 may be simultaneously exposed for an exposure duration, and the accumulated charge may be read out row by row. In this example, there is no read out of rows below 128 or above 256. In the rolling shutter mode, a window of 128 rows between rows 128 and 256 may be exposed and read out using a rolling exposure zone as discussed above. Again there would not be any read out of rows below 128 or above 256.

Figure 1:
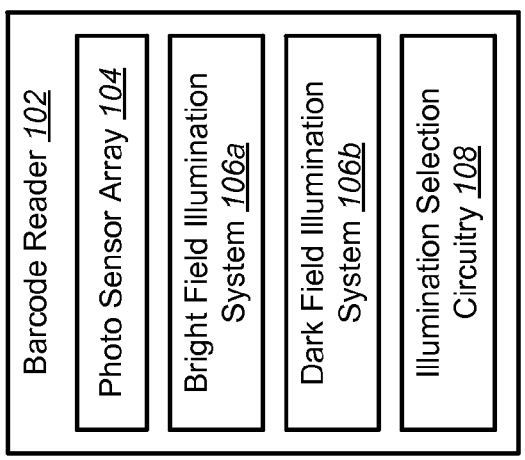
FIG. 1 illustrates one configuration of a barcode reader in accordance with the present disclosure.

As indicated above, the present disclosure relates generally to techniques for selecting the type of illumination that will be most suitable for reading a barcode in a particular situation. FIG. 1 illustrates one configuration of a barcode reader 102 in accordance with the present disclosure.

The barcode reader 102 includes a photo sensor array 104. The photo sensor array 104 may be capable of operating in accordance with a global shutter mode of operation and/or a rolling shutter mode of operation, as discussed above. The photo sensor array 104 may also be capable of utilizing windowing, as discussed above.

The barcode reader 102 also includes a plurality of illumination systems 106*a-b* having different illumination characteristics. Some examples of different illumination characteristics include the angle of illumination with respect to an optical axis, the intensity of illumination, the wavelength of illumination, diffusion characteristics of the illumination, etc.

The plurality of illumination systems 106 may include a bright field illumination system 106*a* and a dark field illumination system 106*b*. The bright field illumination system 106*a* may provide illumination having characteristics designed to illuminate a target area that is located relatively far away from the reader 102. Conversely, the dark field illumination system 106*b* may provide illumination having characteristics designed to illuminate a target area that is located relatively close to the reader 102.

Of course, the number of illumination systems 106*a-b* shown in FIG. 1 is for purposes of example only. In an alternative configuration, a barcode reader may include more than two different illumination systems. Alternatively still, a barcode reader in accordance with the present disclosure may include a single illumination system that is configured to provide illumination having different illumination characteristics (e.g., by changing the intensity, wavelength, angle, and/or diffusion characteristics of the illumination).

The barcode reader 102 also includes illumination selection circuitry 108. The illumination selection circuitry 108 may be configured to perform operations that are related to selecting the type of illumination that will be most suitable for reading a barcode in a particular situation.

Figure 2:
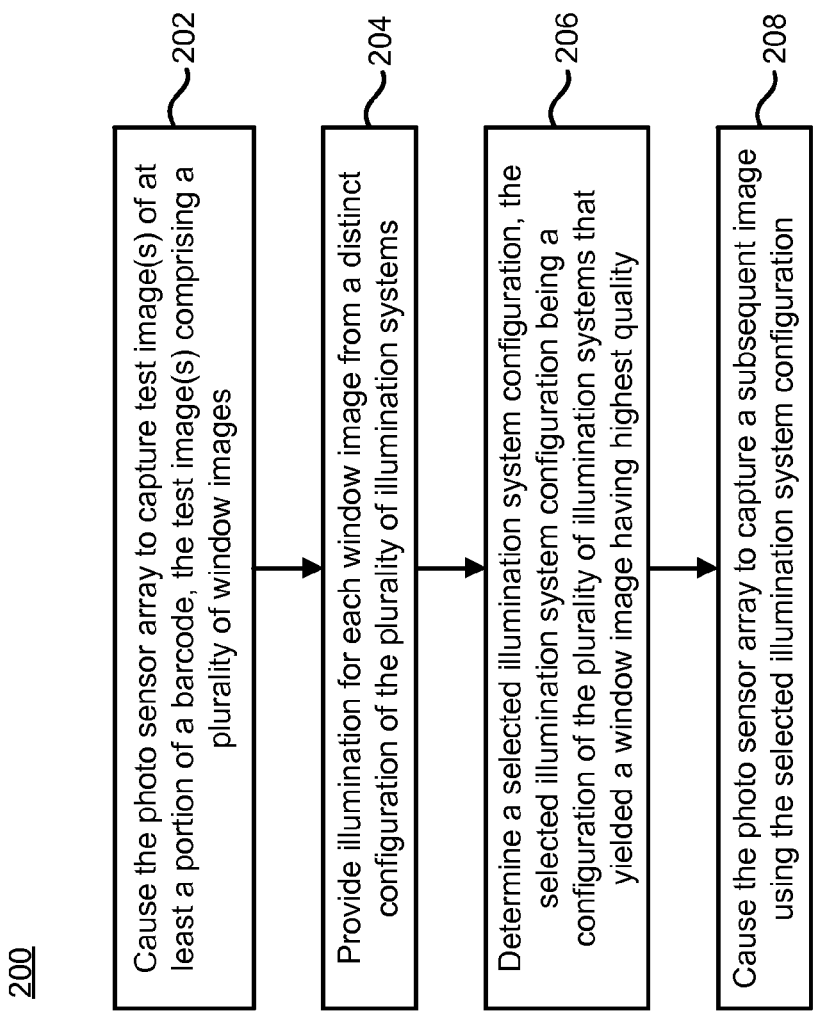
FIG. 2 illustrates an example of a method that may be performed by the illumination selection circuitry of the barcode reader in accordance with the present disclosure.

FIG. 2 illustrates an example of a method 200 that may be performed by the illumination selection circuitry 108 in accordance with the present disclosure. The circuitry 108 may be configured to cause the photo sensor array 104 to capture 202 at least one test image. For example, the photo sensor array 104 may capture 202 a single test image 410 (see, e.g., FIGS. 3 and 4). Alternatively, the photo sensor array 104 may capture 202 a plurality of test images 610*a-b* (see, e.g., FIGS. 5, 6A and 6B).

The photo sensor array 104 may utilize windowing when the test image(s) are captured 202, so that the test image(s) may each be smaller than a full photo sensor array image. As used herein, the term "full photo sensor array image" refers to an image that is captured when an entire photo sensor array 104 is exposed and read out. Thus, a full photo sensor array image may include pixels corresponding to all of the photo sensors in the photo sensor array 104. In contrast, the test image(s) may each include pixels corresponding to only a subset (i.e., less than all) of the photo sensors in the photo sensor array 104. Capturing a test image that includes pixels corresponding to only a subset of the photo sensors in the photo sensor array 104 takes less time than capturing a full photo sensor array image.

The test image(s) may include at least a portion of a barcode. That is, only a portion of a barcode (i.e., less than an entire barcode) may be visible in the test image(s). Alternatively, an entire barcode may be visible in the test image(s).

The test image(s) may include a plurality of window images. As used herein, the term "window image" refers to an image that is smaller than a full photo sensor array image. In one possible configuration, a single test image 410 may be captured, and the single test image 410 may comprise a plurality of window images 412*a-b*. (See, e.g., FIG. 4.) In another possible configuration, a plurality of test images 610*a-b* may be captured, and each test image 610 may comprise a window image 612. (See, e.g., FIGS. 6A-6B.)

Returning to FIG. 2, the circuitry 108 may be configured to provide 204 illumination for each window image from a distinct configuration of the plurality of illumination systems 106*a-b*. For example, if the barcode reader 102 includes a bright field illumination system 106*a* and a dark field illumination system 106*b*, the test image(s) may include at least two different window images. The illumination for capturing a first window image may be provided solely by the bright field illumination system 106*a*, and the illumination for capturing a second window image may be provided solely by the dark field illumination system 106*b*.

Alternatively, multiple illumination systems 106*a-b* may be activated at the same time with various permutations of balanced intensity. For example, the illumination for capturing the first window image may be provided by the bright field illumination system 106*a* at 60% power and the dark field illumination system 106*b* at 40% power. The illumination for capturing the second window image may be provided by the bright field illumination system 106*a* at 40% power and the dark field illumination system 106*b* at 60% power.

The circuitry 108 may also be configured to determine 206 a selected illumination system configuration. The selected illumination system configuration may be a configuration of the plurality of illumination systems 106a-b that yielded a window image having highest quality among the plurality of window images.

Generally speaking, the quality of an image of a barcode may be measured in terms of the contrast between the light cells and the dark cells within the barcode. A barcode image having relatively high contrast between dark cells and light cells may be considered to have higher quality than another barcode image having relatively low contrast between dark cells and light cells.

The terms "dark cells" and "light cells" are used herein because barcodes have traditionally been printed with ink. This gives barcodes the appearance of having dark cells (the portion that is printed with ink) and light cells (the unprinted substrate background, typically white). However, with direct part mark technology, ink is not always used and other techniques (e.g., laser/chemical etching and/or dot peening) may be used instead. Such techniques may be utilized to create a barcode by causing different portions of a substrate to have different reflective characteristics. When these different portions of the substrate are imaged, the resulting barcode image may have the appearance of including dark cells and light cells. Therefore, as used herein, the terms "dark cells" and "light cells" should be interpreted as applying to barcodes that are printed with ink as well as barcodes that are created using other technologies.

The contrast between the dark cells and the light cells in a barcode may be a function of illumination. Ideally, it is desirable to provide illumination that is consistent across the barcode and of an intensity such that the exposure of the image yields both dark cells and light cells that are within the dynamic range of the photo sensor array 104. This yields better contrast than any of the following: (i) a dimly lit barcode; (ii) a brightly lit barcode wherein the image is washed out beyond the dynamic range of the photo sensor array 104; (iii) an unevenly lit barcode with bright washed out spots; or (iv) a barcode illuminated with illumination that is not compatible with the reflectivity characteristic(s) of the cells of the barcode. An example of (iv) is that illumination directed from the sides of the field of view yields a higher contrast image of a barcode formed by etching technology than does illumination parallel to the optical axis.

If the quality of a window image is measured in terms of contrast, determining 206 the selected illumination system configuration may include determining which window image of the plurality of window images has highest contrast between light and dark cells of the barcode, and determining which configuration of the plurality of illumination systems 106a-b was activated when the window image having the highest contrast was captured.

Alternatively, the quality of the window images may be measured in terms of the presence of desired barcode features and/or patterns. A score or metric may be calculated for each window image. A particular window image's score/metric may indicate the number of desired barcode features and/or patterns that are detected in the window image. For example, a higher score/metric may indicate a greater number of desired barcode features and/or patterns (or vice versa). If the quality of the window images is measured in this way, then determining 206 the selected illumination system configuration may include determining which window image of the plurality of window images has the most favorable score/metric based on features or patterns of the barcode, and determining which configuration of the plurality of illumination systems 106a-b was activated when the window image having the most favorable score/metric was captured.

The circuitry 108 may also be configured to cause the photo sensor array 104 to capture 208 a subsequent image using the selected illumination system configuration. The subsequent image may be captured using a global shutter or a rolling shutter mode of operation. As indicated above, the test image(s) may include only a portion of a barcode (i.e., only part of the barcode may be visible within the test image(s)). However, the subsequent image may include an entire barcode (i.e., the entire barcode may be visible within the subsequent image).

The subsequent image may be a full photo sensor array image. That is, the subsequent image may include pixels corresponding to all of the photo sensors in the photo sensor array 104. Alternatively, the subsequent image may include pixels corresponding to substantially all of the photo sensors in the photo sensor array 104. In this context, the phrase "substantially all" of the photo sensors in the photo sensor array 104 may mean at least 95% of the photo sensors in the photo sensor array 104.

Figure 2A:
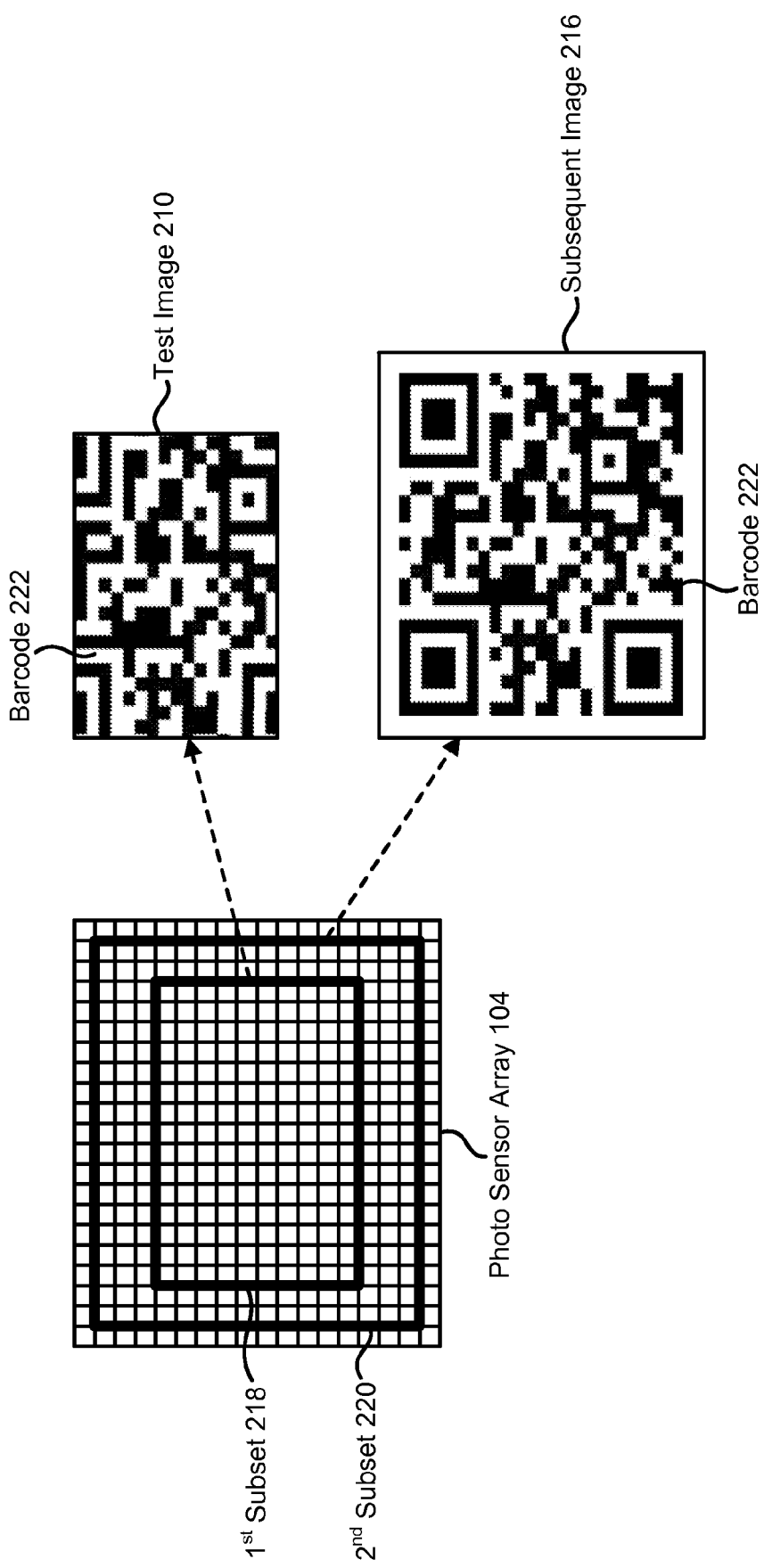
FIG. 2A illustrates an example showing the relative size of a test image compared with a subsequent image.

Alternatively still, the size of the subsequent image may be larger than the test image(s), but less than a full photo sensor array image. For example, referring to FIG. 2A, a test image 210 may include pixels corresponding to a first subset 218 of the photo sensors in the photo sensor array 104, and the subsequent image 216 may include pixels corresponding to a second subset 220 of the photo sensors in the photo sensor array 104. The second subset 220 may be larger than the first subset 218. However, the second subset 220 may not include all of the photo sensors in the photo sensor array 104.

The size and location of the second subset 220 may be determined based on defined rules. For example, the size and location of the second subset 220 may correspond to the size and location of a previously read barcode. Alternatively, the size and location of the second subset 220 may be determined by estimating the border of the barcode 222 in the test image 210 based on characteristics of the barcode 222 visible in the test image 210, and then setting the size and location of the second subset 220 to include the estimated border.

As another example, if the dark field illumination system 106b yields a higher quality window image than the bright field illumination system 106a, then the entire photo sensor array 104 may be utilized to capture the subsequent image 216 (because the "up close" barcode 222 will be larger). Conversely, if the bright field illumination system 106a yields a higher quality window image than the dark field illumination system 106b, then a subset 220 (e.g., a central portion) of the photo sensors within the photo sensor array 104 may be utilized to capture the subsequent image 216 (because the "far away" barcode 222 will be smaller).

Figure 3:
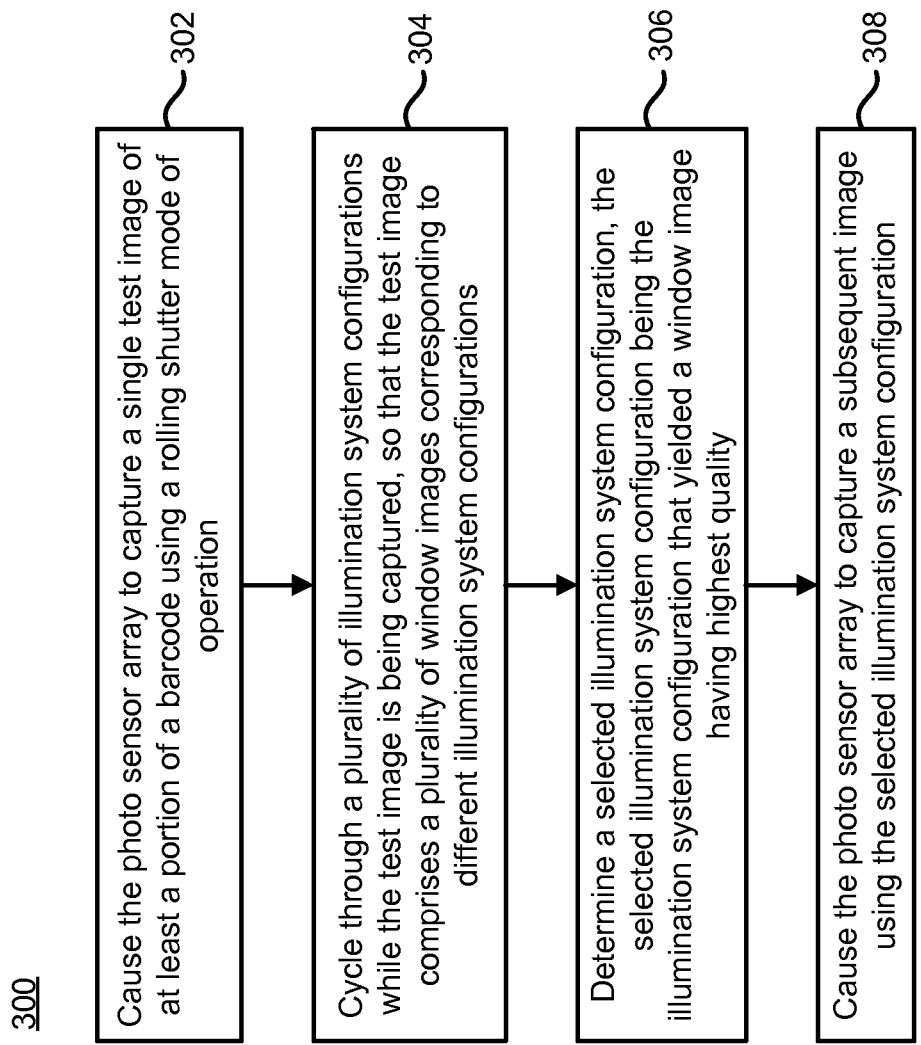
FIG. 3 illustrates another example of a method that may be performed by the illumination selection circuitry in accordance with the present disclosure.

FIG. 3 illustrates another example of a method 300 that may be performed by the illumination selection circuitry 108 in accordance with the present disclosure. The circuitry 108 may be configured to cause the photo sensor array 104 to capture 302 a single test image 410 (shown in FIG. 4) of at least a portion of a barcode using a rolling shutter mode of operation. Windowing may be utilized, so that the test image 410 may be smaller than a full photo sensor array image.

The circuitry 108 may be configured to cycle through 304 a plurality of configurations of the plurality of illumination systems 106a-b while the test image 410 is being captured, so that each illumination system configuration is activated for a distinct time period while the test image 410 is being captured and is not otherwise activated while the test image 410 is being captured. Consequently, the test image 410 may include a plurality of window images 412a-b. Each window image 412 may correspond to a distinct band (e.g., a horizontal band) within the test image 410, and each window image 412 may correspond to a distinct illumination system configuration.

For example, during exposure of a first section 414a of the photo sensor array 104, the bright field illumination system 106a may be activated, while the dark field illumination system 106b may be deactivated. During exposure of a second section 414b of the photo sensor array 104, the dark field illumination system 106b may be activated, while the bright field illumination system 106a may be deactivated. (Both the bright field illumination system 106a and the dark field illumination system 106b may be activated during exposure of the section of the photo sensor array 104 between the first section 414a and the second section 414b, as the transition is made from one system to the other.)

In this example, the test image 410 that is captured includes two distinct bands. The band corresponding to the first section 414a of the photo sensor array 104 is captured using illumination solely from the bright field illumination system 106a. Thus, this window image 412a may indicate the suitability of the bright field illumination system 106a for capturing an image of a barcode. The band corresponding to the second section 414b of the photo sensor array 104 is captured using illumination solely from the dark field illumination system 106b. Thus, this window image 412b may indicate the suitability of the dark field illumination system 106b for capturing a barcode.

In the example just described, there is one window image 412 for each illumination system 106. However, under some circumstances multiple window images may be captured for one or more of the illumination systems 106. For example, during exposure of a first section of the photo sensor array 104, the bright field illumination system 106a may be activated, while the dark field illumination system 106b may be deactivated. During exposure of a second section of the photo sensor array 104, the dark field illumination system 106b may be activated, while the bright field illumination system 106a may be deactivated. During exposure of a third section of the photo sensor array 104, the bright field illumination system 106a may be activated at reduced power (e.g., 50%), while the dark field illumination system 106b may be deactivated. The test image in this example may include three window images corresponding to three distinct bands within the test image. The first window image may indicate the suitability of the bright field illumination system 106a for capturing an image of a barcode. The second window image may indicate the suitability of the dark field illumination system 106b for capturing an image of a barcode. The third window image may indicate the suitability of the bright field illumination system 106a, operating at reduced power, for capturing an image of a barcode.

Alternatively, both illumination systems 106a-b may be activated at the same time with various permutations of balanced intensity. For example, the band corresponding to the first section 414a of the photo sensor array 104 may be captured using illumination from the bright field illumination system 106a powered at 60% and the dark field illumination system 106b powered at 40%. The band corresponding to the second section 414b of the photo sensor array 104 may be captured using illumination from the bright field illumination system 106a powered at 40% and the dark field illumination system 106b powered at 60%.

Figure 4:
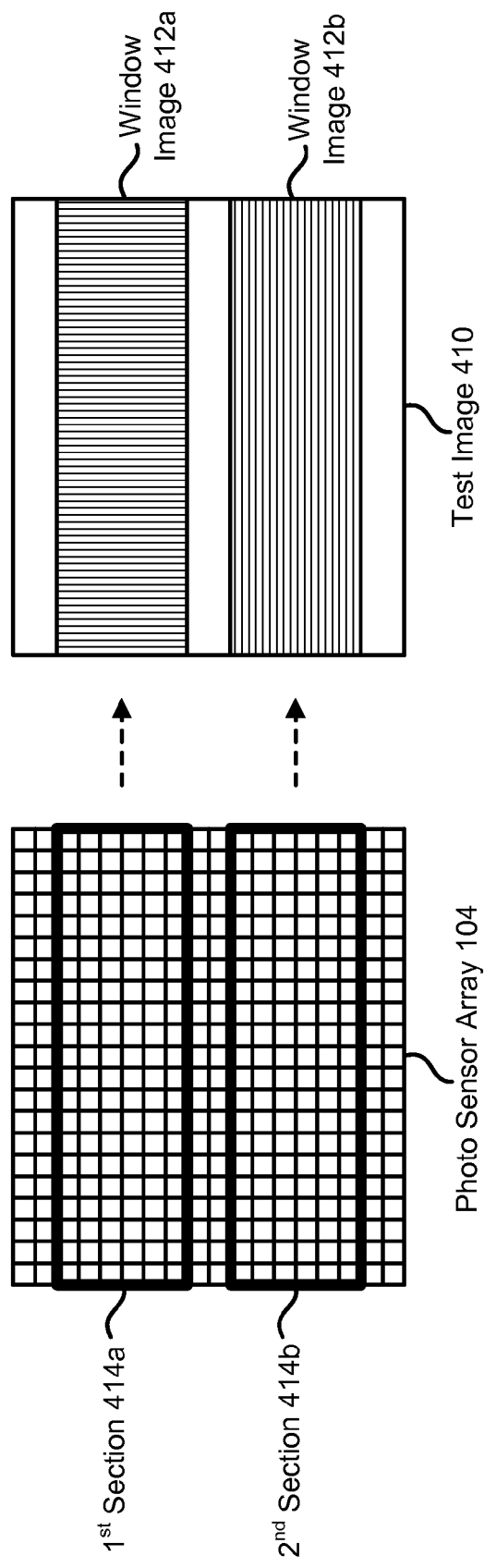
FIG. 4 illustrates one example of a single test image comprising a plurality of window images.
Figure 4A:
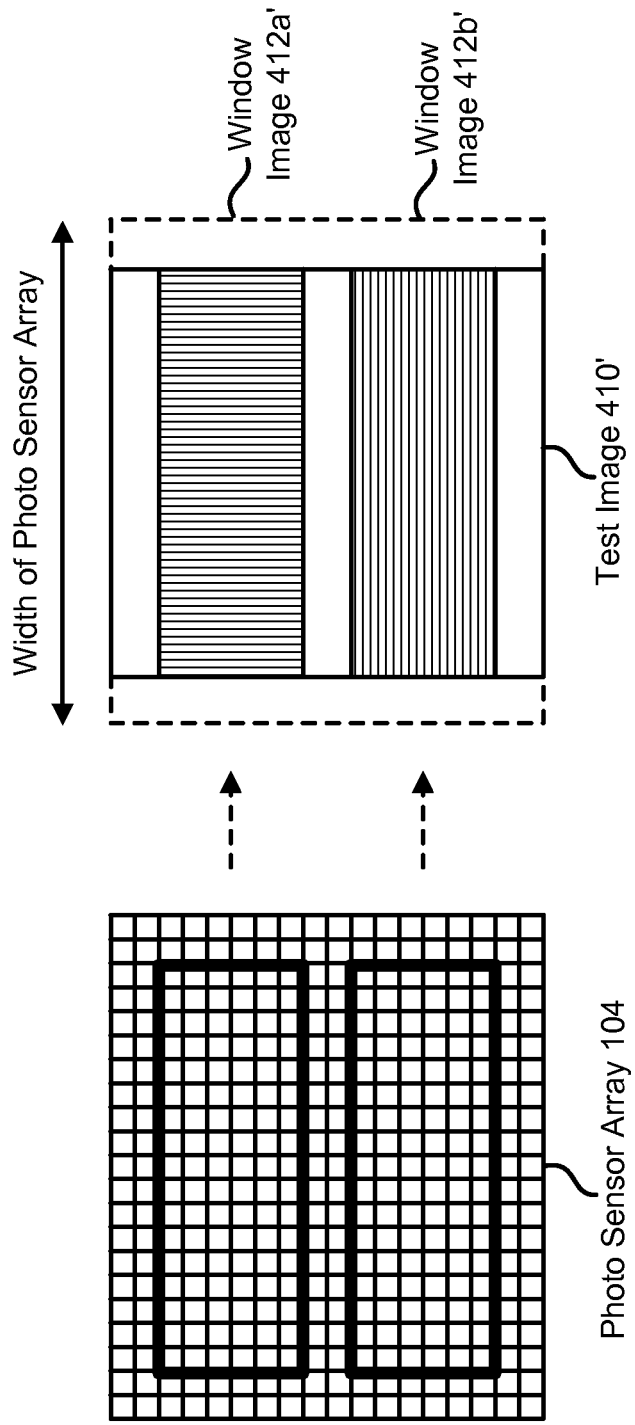
FIG. 4A illustrates another example of a single test image comprising a plurality of window images.

In FIG. 4, the width of the test image 410 and the width of the window images 412a, 412b within the test image 410 are shown as being equal to the width of the photo sensor array 104. As shown in FIG. 4A, however, the width of the test image 410' and the width of the window images 412a', 412b' within the test image 410' may alternatively be less than the width of the photo sensor array 104.

Returning to FIG. 3, the circuitry 108 may also be configured to determine 306 a selected configuration of the plurality of illumination systems 106a-b. The selected illumination system configuration may be the configuration of the plurality of illumination systems 106a-b that yielded a window image 412 having highest quality among the plurality of window images 412a-b. The circuitry 108 may also be configured to cause the photo sensor array 104 to capture 308 a subsequent image using the selected illumination system configuration.

FIG. 5 illustrates another example of a method 500 that may be performed by the illumination selection circuitry 108 in accordance with the present disclosure. The circuitry 108 may be configured to cause the photo sensor array 104 to capture 502 a plurality of test images 610a-b (shown in FIGS. 6A-6B) of at least a portion of a barcode. The plurality of test images 610a-b may be captured 502 using a rolling shutter mode of operation or using a global shutter mode of operation. As shown in FIG. 6A, the plurality of test images 610a-b may correspond to different sections of the photo sensor array 104. In other words, a first section of the photo sensor array 104 may be exposed and read out in order to capture the first test image 610a, and a second section of the photo sensor array 104 may be exposed and read out in order to capture the second test image 610b. Alternatively, as shown in FIG. 6B, the plurality of test images 610a-b may correspond to the same section of the photo sensor array 104. In other words, the same section of the photo sensor array 104 may be exposed and read out in order to capture both test images 610a-b.

The circuitry 108 may be configured to cycle through 504 a plurality of configurations of the plurality of illumination systems 106a-b while the plurality of test images 610a-b are being captured, so that each illumination system configuration is used as the sole source of illumination for at least one test image 610. Each test image 610 may therefore be considered to be a window image 612 corresponding to a particular illumination system configuration. In other words, the plurality of test images 610a-b may comprise a plurality of window images 612a-b. Each window image 612 may correspond to a different one of the plurality of test images 610a-b. Each window image 612 may also correspond to a different one of the plurality of illumination system configurations.

For example, a first test image 610a and a second test image 610b may be captured. The bright field illumination system 106a may be activated and the dark field illumination system 106b may be deactivated while the first test image 610a is being captured. Conversely, the dark field illumination system 106b may be activated and the bright field illumination system 106a may be deactivated while the second test image 610b is being captured. The first test image 610a may be considered to be a window image 612a corresponding to the bright field illumination system 106a. The second test image 610b may be considered to be a window image 612b corresponding to the dark field illumination system 106b.

Alternatively, the bright field illumination system 106a may be activated at 60% power and the dark field illumination system 106b may be activated at 40% power while the first test image 610a is being captured. The bright field illumination system 106a may be activated at 40% power and the dark field illumination system 106b may be activated at 60% power while the second test image 610b is being captured.

Returning to FIG. 5, the circuitry 108 may also be configured to determine 506 a selected illumination system configuration. The selected illumination system configuration may be the configuration of the plurality of illumination systems 106a-b that yielded a window image 612 having highest quality among the plurality of window images 612a-b. The circuitry 108 may also be configured to cause the photo sensor array 104 to capture 508 a subsequent image using the selected illumination system configuration.

In the examples that are shown in FIGS. 6A and 6B, the width of the test images 610a-b and window images 612a-b are equal to the width of the photo sensor array 104. Alternatively, however, the width of the test images and window images may be less than the width of the photo sensor array 104.

Figure 7:
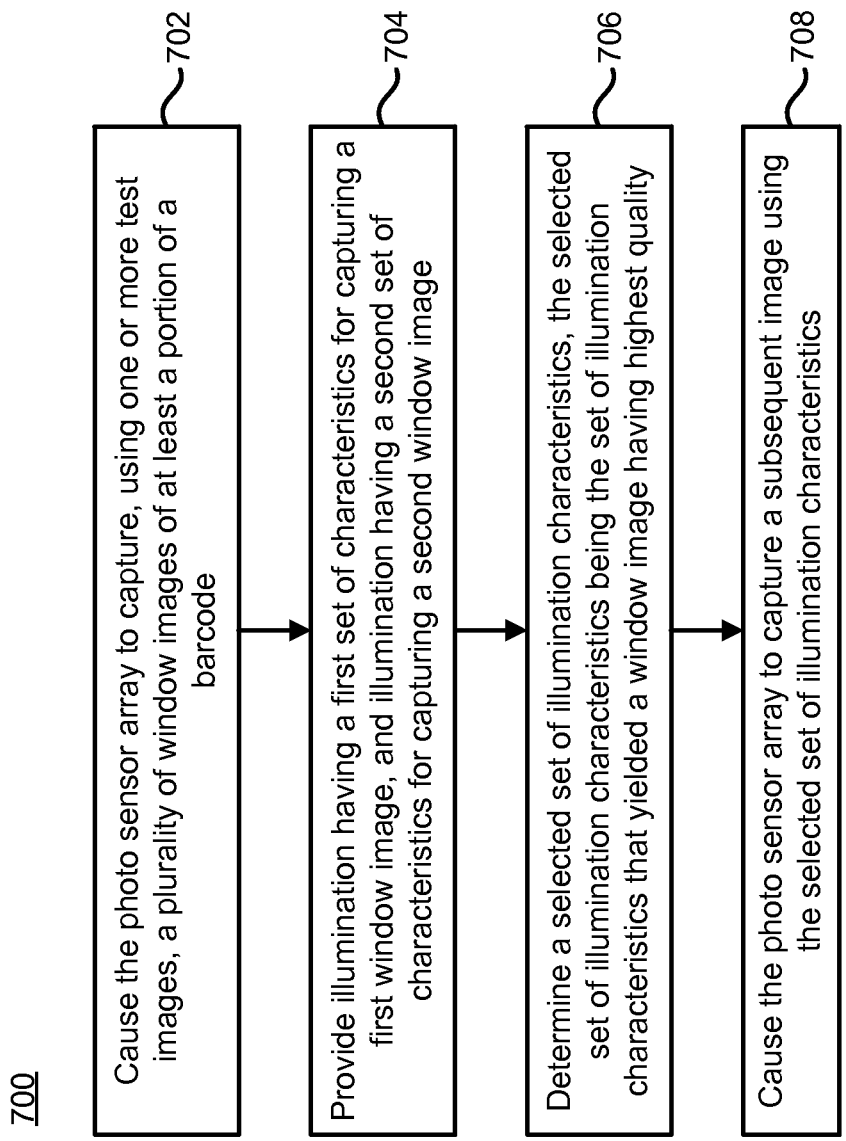
FIG. 7 illustrates another example of a method that may be performed by the illumination selection circuitry in accordance with the present disclosure.

FIG. 7 illustrates another example of a method 700 that may be performed by the illumination selection circuitry 108 in accordance with the present disclosure. The illumination selection circuitry 108 may be configured to cause the photo sensor array 104 to capture 702, using one or more test images, a plurality of window images of at least a portion of a barcode.

The plurality of window images may include a first window image and a second window image. The illumination selection circuitry 108 may be configured to provide 704 illumination having a first set of illumination characteristics for capturing the first window image and illumination having a second set of illumination characteristics (different than the first set of illumination characteristics) for capturing the second window image. In this context, a "set of illumination characteristics" may include multiple illumination characteristics, or only a single illumination characteristic. Some examples of different illumination characteristics were described above.

Different illumination systems 106a-b may be utilized to provide illumination having different illumination characteristics. Alternatively, a single illumination system 106 may be utilized, but the illumination system may be capable of providing illumination having different illumination characteristics.

The illumination selection circuitry 108 may also be configured to determine 806 a selected set of illumination characteristics. The selected set of illumination characteristics may be the set of illumination characteristics that yielded a window image having highest quality among the plurality of window images.

As indicated above, the quality of a window image may be measured in terms of image contrast. Therefore, determining 706 the selected set of illumination characteristics may include determining which window image of the plurality of window images has highest contrast between light and dark cells of the barcode, and determining which set of illumination characteristics was utilized when the window image having the highest contrast was captured.

Alternatively, as indicated above, the quality of a window image may be measured in terms of the presence of desired barcode features and/or patterns. Therefore, determining 706 the selected set of illumination characteristics may include determining which window image of the plurality of window images has the most favorable score/metric based on features or patterns of the barcode, and determining which set of illumination characteristics was utilized when the window image having the most favorable score/metric was captured.

The illumination selection circuitry 108 may also be configured to cause the photo sensor array 104 to capture 708 a subsequent image using the selected set of illumination characteristics. The subsequent image may be captured using a global shutter or a rolling shutter mode of operation. As indicated above, the test image(s) may include only a portion of a barcode. However, the subsequent image may include an entire barcode.

Figure 8:
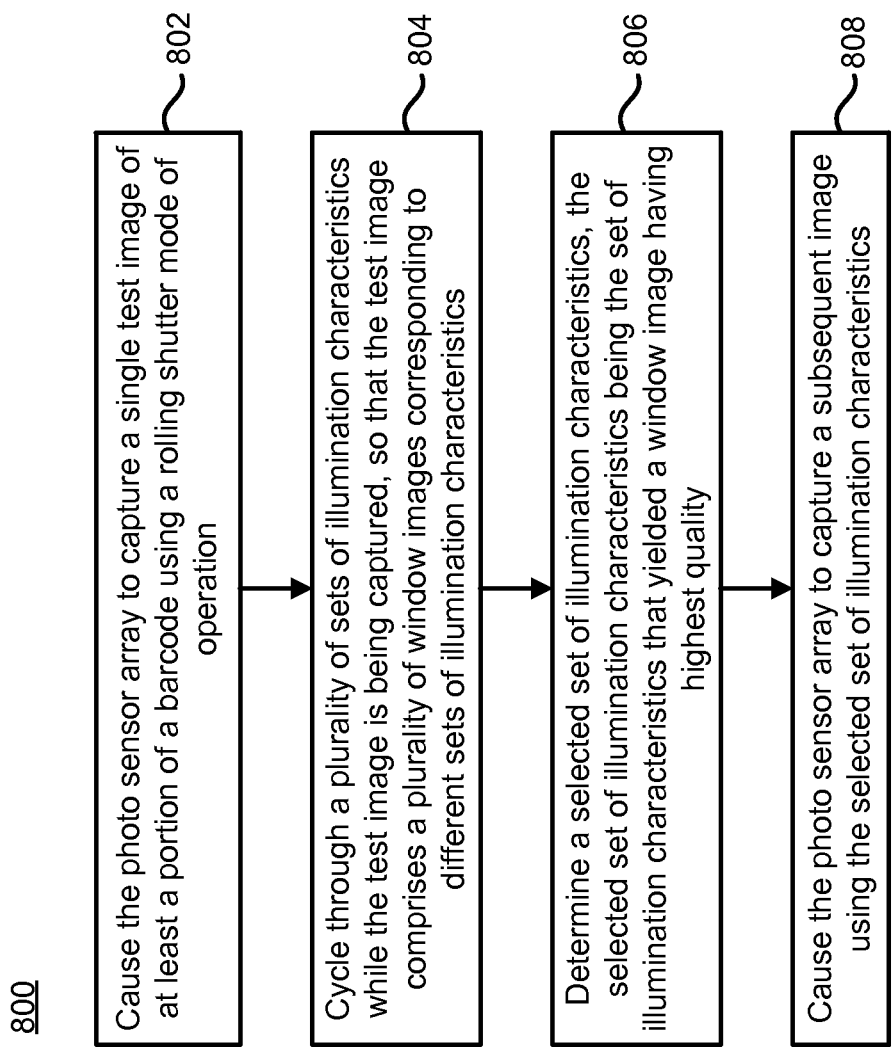
FIG. 8 illustrates another example of a method that may be performed by the illumination selection circuitry in accordance with the present disclosure.

FIG. 8 illustrates another example of a method 800 that may be performed by the illumination selection circuitry 108 in accordance with the present disclosure. The illumination selection circuitry 108 may be configured to cause the photo sensor array 104 to capture 802 a single test image 410 of at least a portion of a barcode using a rolling shutter mode of operation. Windowing may be utilized, so that the test image 410 may be smaller than a full photo sensor array image.

The circuitry 108 may be configured to cycle 804 through a plurality of sets of illumination characteristics while the test image 410 is being captured, so that each set of illumination characteristics is utilized for a distinct time period while the single test image 410 is being captured and is not otherwise utilized while the single test image 410 is being captured. Consequently, the test image 410 may include a plurality of window images 412a-b, where each window image 412 corresponds to a distinct band within the test image 410, and where each window image 412 corresponds to a distinct one of the plurality of sets of illumination characteristics.

For example, during exposure of a first section 414a of the photo sensor array 104, a first set of illumination characteristics (e.g., direct, high intensity illumination) may be utilized. The window image 412a may correspond to this first set of illumination characteristics. During exposure of a second section 414b of the photo sensor array 104, a second set of illumination characteristics (e.g., angled, low intensity, diffuse illumination) may be utilized. The window image 412b may correspond to this second set of illumination characteristics.

Alternatively, during exposure of the first section 414a of the photo sensor array 104, both the bright field illumination system 106a and the dark field illumination system 106b may be activated, with the bright field illumination system 106a powered at 60% and the dark field illumination system 106b powered at 40%. During exposure of the second section 414b of the photo sensor array 104, both the bright field illumination system 106a and the dark field illumination system 106b may be activated, with the bright field illumination system 106a powered at 40% and the dark field illumination system 106b powered at 60%.

The circuitry 108 may also be configured to determine 806 a selected set of illumination characteristics. The selected set of illumination characteristics may be the set of illumination characteristics that yielded a window image 412 having highest quality among the plurality of window images 412a-b. The circuitry 108 may also be configured to cause the photo sensor array 104 to capture 808 a subsequent image using the selected set of illumination characteristics.

Figure 9:
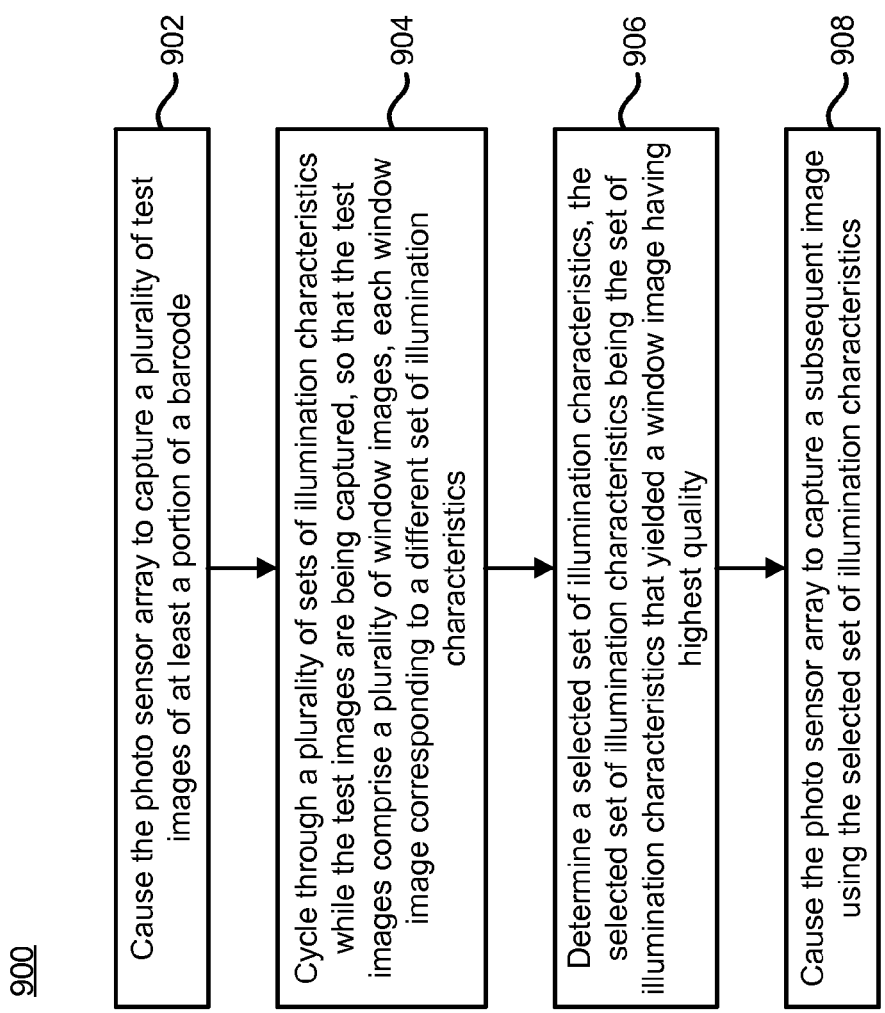
FIG. 9 illustrates another example of a method that may be performed by the illumination selection circuitry in accordance with the present disclosure.

FIG. 9 illustrates another example of a method 900 that may be performed by the illumination selection circuitry 108 in accordance with the present disclosure. The circuitry 108 may be configured to cause the photo sensor array 104 to capture 902 a plurality of test images 610a-b of at least a portion of a barcode. The plurality of test images 610a-b may be captured using a rolling shutter mode of operation or using a global shutter mode of operation. The plurality of test images may correspond to different sections of the photo sensor array 104 (as shown in FIG. 6A), or to the same section of the photo sensor array 104 (as shown in FIG. 6B).

The circuitry 108 may be configured to cycle 904 through a plurality of sets of illumination characteristics while the plurality of test images 610a-b are being captured, so that each set of illumination characteristics is used as the sole source of illumination for at least one test image 610. Each test image 610 may therefore be considered to be a window image 612 corresponding to a particular set of illumination characteristics. In other words, the plurality of test images 610a-b may include a plurality of window images 612a-b, where each window image 612 may correspond to a different one of the plurality of test images 610a-b, and where each window image 612 may correspond to a different one of the plurality of sets of illumination characteristics.

The circuitry 108 may also be configured to determine 906 a selected set of illumination characteristics. The selected set of illumination characteristics may be the set of illumination characteristics that yielded a window image having highest quality among the plurality of window images. The circuitry 108 may also be configured to cause the photo sensor array 104 to capture 908 a subsequent image using the selected set of illumination characteristics.

Figure 10:
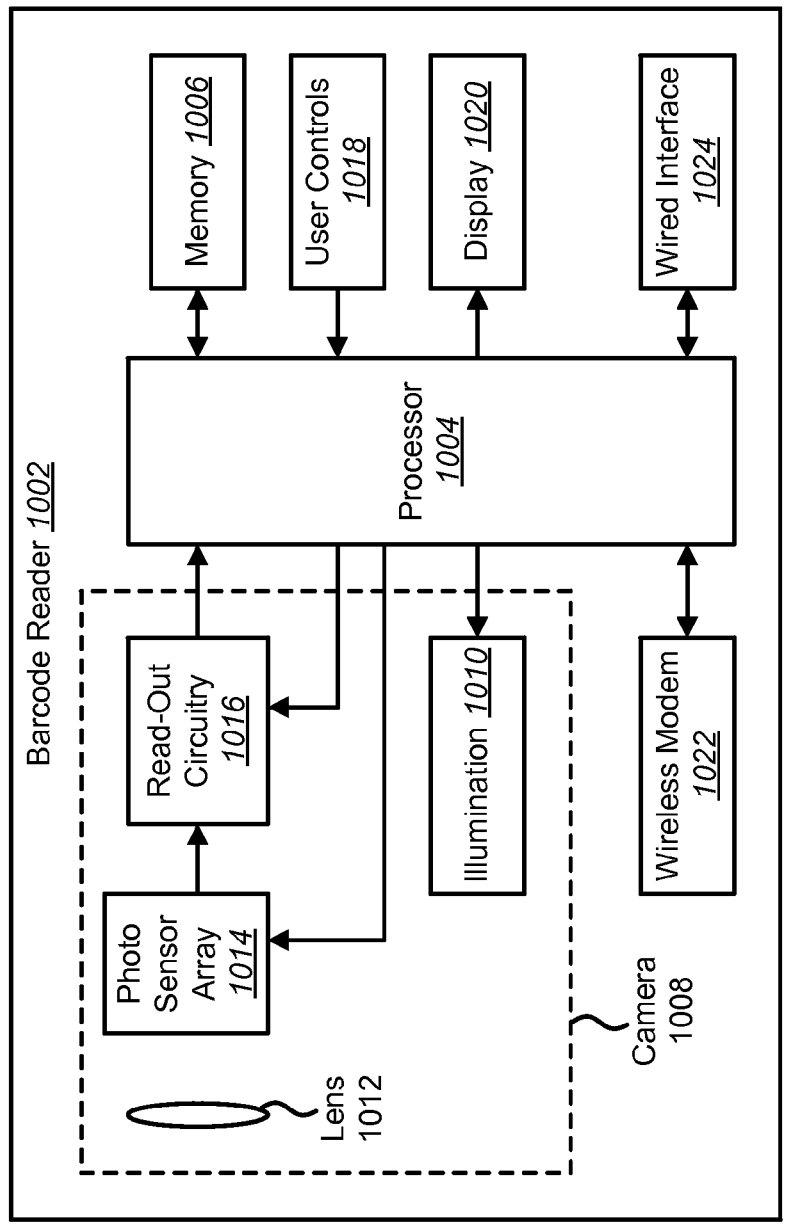
FIG. 10 illustrates various components that may be utilized in a barcode reader.

FIG. 10 illustrates various components that may be utilized in a barcode reader 1002. The barcode reader 102 described previously may include some or all of the components of the barcode reader 1002.

The barcode reader 1002 includes a processor 1004. The processor 1004 may be a general purpose single- or multi-chip microprocessor (e.g., an ARM), a special purpose microprocessor (e.g., a digital signal processor (DSP)), a microcontroller, a programmable gate array, etc. The processor 1004 may be referred to as a central processing unit (CPU). Although just a single processor 1004 is shown in the barcode reader 1002 of FIG. 10, in an alternative configuration, a combination of processors (e.g., an ARM and DSP) could be used.

The barcode reader 1002 also includes memory 1006 in electronic communication with the processor 1004. That is, the processor 1004 can read information from and/or write information to the memory 1006. The memory 1006 may be any electronic component capable of storing electronic information. The memory 1006 may be random access memory (RAM), read-only memory (ROM), magnetic disk storage media, optical storage media, flash memory devices in RAM, on-board memory included with the processor 1004, programmable read-only memory (PROM), erasable programmable read-only memory (EPROM), electrically erasable PROM (EEPROM), registers, and so forth, including combinations thereof.

Data and instructions may be stored in the memory 1006. The instructions may include one or more programs, routines, sub-routines, functions, procedures, etc. The instructions may include a single computer-readable statement or many computer-readable statements. The instructions may be executable by the processor 1004 to implement one or more of the methods, operations, functions and/or procedures described above. Executing the instructions may involve the use of the data that is stored in the memory 1006.

The barcode reader 1002 may include several components that may collectively be referred to as a camera 1008. Illumination components 1010 within the camera 1008 may be activated so as to illuminate a target area. The illumination components 1010 may be configured to provide illumination having different illumination characteristics (e.g., by changing the intensity, wavelength, angle, and/or diffusion characteristics of the illumination), as described previously. The illumination components 1010 may be included in a plurality of different illumination systems having different illumination characteristics (e.g., a bright field illumination system 106a and a dark field illumination system 106b). Alternatively, the illumination components 1010 may be included within a single illumination system that is configured to provide illumination having different illumination characteristics. The illumination components 1010 may include light-emitting diodes (LEDs) and appropriate control circuitry. One or more lenses 1012 within the camera 1008 may focus light reflected from item(s) within the target area (e.g., a barcode) onto a photo sensor array 1014. The photo sensor array 1014 may be a solid-state photo-detecting device containing a relatively large number of light-sensitive pixels that are arranged in horizontal rows and vertical columns. Readout circuitry 1016 may electronically read the pixels within the photo sensor array 1014 in order to obtain a digital image.

The barcode reader 1002 may include one or more user controls 1018 that may be used to provide user input. Examples of different kinds of user controls 1018 include one or more buttons, a touchscreen, a keyboard (actual and/or virtual), a microphone, a trackball, a lightpen, etc.

The barcode reader 1002 may include a display 1020. The display 1020 may utilize any suitable image projection technology, such as a liquid crystal display (LCD), light-emitting diode (LED), gas plasma, electroluminescence, etc. The display 1020 may be a touchscreen. A display controller may also be provided, for converting data stored in the memory 1006 into text, graphics, and/or moving images (as appropriate) shown on the display 1020.

The barcode reader 1002 may include one or more communication interfaces for communicating with other electronic devices. For example, the barcode reader 1002 may include a wireless modem 1022 that allows the barcode reader 1002 to be connected to a wireless network. Alternatively, or in addition, the barcode reader 1002 may include a wired communication interface 1024 (e.g., a USB interface).

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

One or more of the features, functions, procedures, operations, components, elements, structures, etc., described in connection with any one of the configurations described herein may be combined with one or more of the functions, procedures, operations, components, elements, structures, etc., described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A barcode reader, comprising:
   a photo sensor array;
   a plurality of illumination systems having different illumination characteristics; and
   circuitry that is configured to:
   cause the photo sensor array to capture at least one test image of at least a portion of a barcode, wherein the at least one test image comprises a plurality of window images, each window image being smaller than a full photo sensor array image, wherein illumination for each window image is provided by a distinct configuration of the plurality of illumination systems;

determine a selected illumination system configuration, the selected illumination system configuration being a configuration of the plurality of illumination systems that yielded a window image having highest quality among the plurality of window images; and cause the photo sensor array to capture a subsequent image using the selected illumination system configuration.

2. The barcode reader of claim 1, wherein determining the selected illumination system configuration comprises:

determining which window image of the plurality of window images has highest contrast between light and dark cells of the barcode; and determining which configuration of the plurality of illumination systems was activated when the window image having the highest contrast was captured.

3. The barcode reader of claim 1, wherein determining the selected illumination system configuration comprises:

determining which window image of the plurality of window images has a most favorable score based on features or patterns of the barcode; and determining which configuration of the plurality of illumination systems was activated when the window image having the most favorable score was captured.

4. The barcode reader of claim 1, wherein:

the circuitry is configured to cause the photo sensor array to capture a single test image using a rolling shutter mode of operation; and each window image corresponds to a distinct band within the single test image.

5. The barcode reader of claim 4, wherein the circuitry is configured to cycle through a plurality of configurations of the plurality of illumination systems while the single test image is being captured, so that each illumination system configuration is activated for a distinct time period while the single test image is being captured and is not otherwise activated while the single test image is being captured.

6. The barcode reader of claim 1, wherein:

the circuitry is configured to cause the photo sensor array to capture a plurality of test images, each test image being smaller than a full photo sensor array image; and each window image corresponds to a different one of the plurality of test images.

7. The barcode reader of claim 6, wherein the photo sensor array captures the plurality of test images using a rolling shutter mode of operation.

8. The barcode reader of claim 7, wherein the plurality of test images correspond to different sections of the photo sensor array.

9. The barcode reader of claim 7, wherein the plurality of test images correspond to the same section of the photo sensor array.

10. The barcode reader of claim 6, wherein the photo sensor array captures the plurality of test images using a global shutter mode of operation.

11. The barcode reader of claim 10, wherein the plurality of test images correspond to different sections of the photo sensor array.

12. The barcode reader of claim 10, wherein the plurality of test images correspond to the same section of the photo sensor array.

13. The barcode reader of claim 1, wherein:

the at least one test image comprises only a portion of the barcode; and the subsequent image comprises the entire barcode.

14. The barcode reader of claim 1, wherein the different illumination characteristics are selected from the group consisting of angle of illumination with respect to an optical axis, intensity of illumination, wavelength of illumination, and diffusion characteristics of the illumination.

15. The barcode reader of claim 1, wherein the width of the at least one test image and the width of the plurality of window images are equal to the width of the photo sensor array.

16. The barcode reader of claim 1, wherein the width of the at least one test image and the width of the plurality of window images are less than the width of the photo sensor array.

17. The barcode reader of claim 1, wherein the subsequent image comprises pixels corresponding to substantially all photo sensors in the photo sensor array.

18. The barcode reader of claim 1, wherein:

the at least one test image comprises pixels corresponding to a first subset of photo sensors in the photo sensor array;

the subsequent image comprises pixels corresponding to a second subset of the photo sensors in the photo sensor array; and the second subset is greater than the first subset.

19. A barcode reader, comprising:

a photo sensor array;

at least one illumination system that is configured to provide illumination having different illumination characteristics; and illumination selection circuitry that is configured to:

cause the photo sensor array to capture, using one or more test images, a plurality of window images of at least a portion of a barcode, the plurality of window images including a first window image and a second window image, each window image being smaller than a full photo sensor array image, wherein illumination having a first set of illumination characteristics is used for capturing the first window image, and wherein illumination having a second set of illumination characteristics different than the first set of illumination characteristics is used for capturing the second window image;

determine a selected set of illumination characteristics, the selected set of illumination characteristics being a set of illumination characteristics that yielded a window image having highest quality among the plurality of window images; and cause the photo sensor array to capture a subsequent image using the selected set of illumination characteristics.

20. The barcode reader of claim 19, wherein determining the selected set of illumination characteristics comprises:

determining which window image of the plurality of window images has highest contrast between light and dark cells of the barcode; and determining which illumination characteristic was utilized when the window image having the highest contrast was captured.

21. The barcode reader of claim 19, wherein determining the selected set of illumination characteristics comprises:

determining which window image of the plurality of window images has a most favorable score based on features or patterns of the barcode; and determining which illumination characteristic was utilized when the window image having the most favorable score was captured.

22. The barcode reader of claim 19, wherein:
- the circuitry is configured to cause the photo sensor array to capture a single test image using a rolling shutter mode of operation; and
- each window image corresponds to a distinct band within the single test image.

23. The barcode reader of claim 22, wherein the circuitry is configured to cycle through a plurality of sets of illumination characteristics while the single test image is being captured, so that each set of illumination characteristics is utilized for a distinct time period while the single test image is being captured and is not otherwise utilized while the single test image is being captured.

24. The barcode reader of claim 19, wherein:
- the circuitry is configured to cause the photo sensor array to capture a plurality of test images, each test image being smaller than a full photo sensor array image; and
- each window image corresponds to a different one of the plurality of test images.

25. The barcode reader of claim 24, wherein the photo sensor array captures the plurality of test images using a rolling shutter mode of operation.

26. The barcode reader of claim 25, wherein the plurality of test images correspond to different sections of the photo sensor array.

27. The barcode reader of claim 25, wherein the plurality of test images correspond to the same section of the photo sensor array.

28. The barcode reader of claim 24, wherein the photo sensor array captures the plurality of test images using a global shutter mode of operation.

29. The barcode reader of claim 28, wherein the plurality of test images correspond to different sections of the photo sensor array.

30. The barcode reader of claim 28, wherein the plurality of test images correspond to the same section of the photo sensor array.

31. The barcode reader of claim 19, wherein:
- the one or more test images comprise only a portion of the barcode; and
- the subsequent image comprises the entire barcode.

32. The barcode reader of claim 19, wherein the different illumination characteristics are selected from the group consisting of from angle of illumination with respect to an optical axis, intensity of illumination, wavelength of illumination, and diffusion characteristics of the illumination.

* * * * *